(12) United States Patent
Kim et al.

(10) Patent No.: US 8,187,680 B2
(45) Date of Patent: May 29, 2012

(54) ANTI-STATIC ADHESIVE COMPOSITION, POLARIZING PLATE AND SURFACE PROTECTIVE FILM USING THE COMPOSITION

(75) Inventors: Sung-min Kim, Pyeongtaek-si (KR); Han-young Choi, Pyeongtaek-si (KR); Young-sik Choi, Hongcheon-gun (KR)

(73) Assignee: Dong-Woo Fine-Chem Co. Ltd., Iksan-si, Jeollabuk-do (KR)

( * ) Notice: Subject to any disclaimer, the term of this patent is extended or adjusted under 35 U.S.C. 154(b) by 0 days.

(21) Appl. No.: 12/937,838

(22) PCT Filed: Apr. 15, 2009

(86) PCT No.: PCT/KR2009/001931
§ 371 (c)(1),
(2), (4) Date: Dec. 30, 2010

(87) PCT Pub. No.: WO2009/128645
PCT Pub. Date: Oct. 22, 2009

(65) Prior Publication Data
US 2011/0086186 A1     Apr. 14, 2011

(30) Foreign Application Priority Data

Apr. 15, 2008  (KR) ........................ 10-2008-0034731
Mar. 24, 2009  (KR) ........................ 10-2009-0024954

(51) Int. Cl.
*C09K 19/00*   (2006.01)

(52) U.S. Cl. ........... 428/1.1; 428/1.31; 428/1.5; 349/96; 524/81; 524/236; 524/284

(58) Field of Classification Search ................... 428/1.1, 428/1.31, 1.5, 356, 355 R, 355 AC; 156/307.3; 524/236, 556, 418, 81, 284, 560; 423/386; 349/96

See application file for complete search history.

(56) References Cited

U.S. PATENT DOCUMENTS

| 7,655,285 | B2 | 2/2010 | Cho et al. |
| 7,696,278 | B2 | 4/2010 | Kim et al. |
| 2004/0220348 | A1 | 11/2004 | Michot et al. |
| 2005/0244633 | A1 | 11/2005 | Kobayashi et al. |
| 2006/0279923 | A1 * | 12/2006 | Kim et al. ................. 361/683 |

FOREIGN PATENT DOCUMENTS

| JP | 05-140519 | 6/1993 |
| JP | 61-28539 A | 5/1994 |
| JP | 2008-163273 | 7/2008 |
| KR | 10-2006-0047584 | 5/2006 |
| KR | 10-2007-0041238 | 4/2007 |
| KR | 10-2006-0128660 | 12/2008 |
| KR | 10-0908941 | 7/2009 |
| WO | 03/011958 | 2/2003 |

OTHER PUBLICATIONS

Search Report dated Nov. 26, 2009 for International Application No. PCT/KR2009/001931 filed Apr. 15, 2009.
Written Opinion dated Nov. 26, 2009 for International Application No. PCT/KR2009/001931 filed Apr. 15, 2009.

* cited by examiner

*Primary Examiner* — Angela Ortiz
*Assistant Examiner* — Ruiyun Zhang
(74) *Attorney, Agent, or Firm* — Drinker Biddle & Reath LLP

(57) ABSTRACT

Disclosed are an anti-static adhesive composition, and a polarizing plate and/or a surface protective film fabricated using the same. More particularly, an anti-static adhesive composition for imparting enhanced anti-static properties, including a metal salt represented by Formula 1 as an anti-static agent so as to sufficiently inhibit generation of static electricity while not deteriorating inherent physical properties of an adhesive such as adhesiveness, durability and reliability, etc., is provided. In addition, a polarizing plate and and/or a surface protective film fabricated using the foregoing anti-static adhesive composition are provided.

$$M^+[(FSO_2)_2N]^-$$ (Formula 1)

wherein M is an alkali metal.

10 Claims, No Drawings

ANTI-STATIC ADHESIVE COMPOSITION, POLARIZING PLATE AND SURFACE PROTECTIVE FILM USING THE COMPOSITION

CROSS REFERENCE TO RELATED APPLICATIONS:

This application is the National Stage of International Application No. PCT/KR2009/001931 filed Apr. 15, 2009, and claims benefit of KR 10-2008-0034731 filed Apr. 15, 2008 and KR 10-2009-0024954 filed Mar. 24, 2009, which are herein incorporated by reference in their entirety.

TECHNICAL FIELD

The present invention relates to an anti-static adhesive composition for imparting improved anti-static properties while retaining inherent physical properties of the adhesive such as adhesiveness, durability and reliability, etc., a polarizing plate and a surface protective film fabricated using the above composition.

BACKGROUND ART

It is generally known that a liquid crystal display device (LCD) includes a liquid crystal cell and a polarizing plate and requires a bonding layer or an adhesive layer to combine the above elements.

Such a polarizing plate may include a polarizer (sometimes called 'polarizing film') based on polyvinyl alcohol (PVA), which is elongated in a certain direction and contains an iodine compound or dichroic polarizing material adsorbed thereto and oriented, as well as a polarizer protective film laminated on opposite sides of the polarizer to protect them. More particularly, the polarizer may have a multi-layered structure in that a polarizer protective film based on triacetyl cellulose (TAC), an adhesive layer to be in contact with a liquid crystal cell on the protective film and a release film are formed at one side of the polarizer, while another polarizer protective film and a surface protective film comprising another adhesive layer laminated on a substrate film are formed at the other side of the polarizer.

When the polarizing plate with such a structure described above is fixed to the liquid crystal cell, the release film is stripped from the adhesive layer. The surface protective film may also be removed when a role thereof is completed during post treatment. The release film and the surface protective film are generally formed using plastic materials, and therefore, may have improved electrical insulating properties and generate static electricity when the film is released from the polarizing plate.

The generated static electricity may cause several problems such as adsorption of foreign materials to an optical element causing contamination of a surface thereof, distorted orientation of liquid crystals causing staining on the optical element, damage of a thin film transistor (TFT) line, and so forth. In recent years, since a dimension of a polarizing plate used for fabrication of LCDs is enlarged with an increase in size of an LCD panel and generation of static electricity is significantly increased during high speed processing, it may be important to solve such problems.

In order to overcome electrostatic generation problems, a method for imparting anti-static properties to an adhesive has been proposed. For instance, addition of conductive materials comprising conductive metal powder or carbon particles to an adhesive or addition of ionic or non-ionic materials in a form of a surfactant has been employed. However, in order to impart anti-static properties, an excessive amount of conductive metal powder or carbon particles must be added and this may cause a problem of deteriorated transparency. Also, the surfactant is liable to be influenced by humidity and may transfer to a surface of the adhesive, causing a problem of lowered adhesive properties.

Japanese Patent Laid-Open No. 1993-140519 which was opened on Jun. 8, 1993, discloses a method for inhibiting generation of static electricity by adding a plasticizer based on ethyleneoxide modified dioctylphthalate to an adhesive to impart flexible properties thereto. However, this method entailed a problem of transferring to a surface of a polarizing plate which in turn has difficulty in inhibiting initial static electricity.

Korean Patent Laid-Open No. 2004-0030919 which was opened on Apr. 9, 2004, discloses a method for fabrication of an adhesive layer with a surface specific resistance of not more than $10^{-}\Omega$/sq by adding an organic salt to prepare a pressure sensitive adhesive and using the adhesive. However, this method encounters a problem of consuming a large amount of expensive organic salts.

Japanese Patent Laid-Open No. 1994-128539 which was opened on May 10, 1994, discloses a method for imparting anti-static properties by combining polyetherpolyol with at least one alkali-metal salt. However, this method has problems in that an isocyanate based crosslinking agent may influence crosslinkage ability and surface transition due to hydrophilic properties of ethyleneoxide and thus may cause reduced adhesive properties.

DISCLOSURE OF INVENTION

Technical Problem

Accordingly, it is an object of the present invention to provide an anti-static adhesive composition without adverse effects to durability and reliability although a small amount of anti-static agent is added, thereby solving problems such as generation of static electricity, decrease in durability and reliability caused by a large amount of an anti-static agent which is required to endow high anti-static properties to a polarizing plate when the composition is applied to an LCD, and so forth.

Another object of the present invention is to provide a polarizing plate having an adhesive layer laminated thereon, wherein the adhesive layer includes the anti-static adhesive composition described above.

A further object of the present invention is to provide a surface protective film having an adhesive layer laminated thereon, wherein the adhesive layer includes the anti-static adhesive composition described above.

Technical Solution

In order to accomplish the above objects, the present invention provides an anti-static adhesive composition containing an anti-static agent represented by Formula 1:

$$M^{+}[(FSO_2)_2N]^{-} \qquad \text{(Formula 1)}$$

wherein M is an alkali metal.

The present invention also provides a polarizing plate having an anti-static adhesive layer laminated thereon, wherein the anti-static adhesive layer includes the anti-static adhesive composition described above.

The present invention also provides a surface protective film having an anti-static adhesive layer laminated thereon, wherein the anti-static adhesive layer includes the anti-static adhesive composition described above.

Advantageous Effects

According to the present invention, it may be possible to sufficiently inhibit generation of static electricity while not deteriorating inherent physical properties of an adhesive such as adhesiveness, durability and reliability, etc., thereby improving anti-static characteristics.

BEST MODE FOR CARRYING OUT THE INVENTION

The present invention provides an anti-static adhesive, composition for imparting improved anti-static properties while not inhibiting inherent physical properties of an adhesive such as adhesiveness, durability and reliability, etc., a polarizing plate and a surface protective film fabricated using the above anti-static adhesive composition.

Hereinafter, the present invention will be apparent from the following detailed description with reference to the exemplary embodiments and examples.

An anti-static adhesive composition according to the present invention includes an anti-static agent represented by Formula 1, which comprises alkali-metal cation and bis(fluorosulfonyl)imide anion. More particularly, the inventive anti-static adhesive composition contains an adhesive resin, a crosslinking agent as well as the anti-static agent represented by Formula 1:

(Formula 1)

wherein M is an alkali metal.

Such adhesive resin may include common polymer, for example, acrylic copolymer, natural rubber, styrene-isoprene-styrene (SIS) block copolymer, styrene-ethylene butylene-styrene (SEBS) block copolymer, styrene-butadiene rubber, polybutadiene, polyisoprene, polyisobutylene, butyl rubber, chloroprene rubber, silicon rubber. Acrylic copolymer is preferably used.

Such acrylic copolymer may comprise a copolymer consisting of a (meth)acrylate monomer with an alkyl group having 1 to 14 carbon atoms as well as a monomer with a crosslinkable functional group. Here, the (meth)acrylate means both acrylate and methacrylate.

Examples of the (meth)acrylate monomer having 1 to 14 carbon atoms may include methyl (meth)acrylate, ethyl (meth)acrylate, n-butyl (meth)acrylate, s-butyl (meth)acrylate, t-butyl (meth)acrylate, isobutyl (meth)acrylate, hexyl (meth)acrylate, 2-ethylhexyl (meth)acrylate, n-octyl (meth)acrylate, isooctyl (meth)acrylate, n-nonyl (meth)acrylate, isononyl (meth)acrylate, n-decyl (meth)acrylate, isodecyl (meth)acrylate, n-dodecyl (meth)acrylate, n-tridecyl (meth)acrylate, n-tetradecyl (meth)acrylate, etc. Among them, the (meth)acrylate monomer with an alkyl group having 6 to 14 carbon atoms such as hexyl (meth)acrylate, 2-ethylhexyl (meth)acrylate, n-octyl (meth)acrylate, isooctyl (meth)acrylate, n-nonyl (meth)acrylate, isononyl (meth)acrylate, n-decyl (meth)acrylate, isodecyl (meth)acrylate, n-dodecyl (meth)acrylate, n-tridecyl (meth)acrylate, n-tetradecyl (meth)acrylate, and the like is preferably used for fabrication of a surface protective film because the above monomer controls adhesiveness of the adhesive to a subject adhered in a low level, thus having excellent removable characteristics.

The (meth)acrylate monomer having 1 to 14 carbon atoms may be contained in an amount of 50 to 99 wt. % in a total weight of the monomer (that is, 100 wt. %) included in acrylic copolymer.

The monomer having a crosslinkable functional group serves to endow desired cohesion or adhesive intensity by chemical bonding, so that the monomer reacts with the crosslinking agent to prevent cohesive force of the adhesive from being degraded even under high temperature and/or moisture conditions. Such monomer may include, for example, sulfonic acid group containing monomer, phosphoric acid group containing monomer, cyano group containing monomer, vinyl ester, an aromatic vinyl compound, carboxyl group containing monomer, acid anhydride group containing monomer, hydroxyl group containing monomer, amide group containing monomer, amino group containing monomer, imide group containing monomer, epoxy group containing monomer, ether group containing monomer, etc., which is used alone or as a combination of two or more thereof.

The sulfonic acid group containing monomer may include, for example, styrene sulfonate, allyl sulfonate, 2-(meth)acrylamido-2-methylpropane sulfonate, (meth)acrylamidopropane sulfonate, sulfopropyl (meth)acrylate, (meth)acryloyl oxy-naphthalene sulfonate, sodium vinylsulfonate, etc.

An example of the phosphoric acid group containing monomer is 2-hydroxyethylacryloyl phosphate.

An example of the cyano group containing monomer is (meth)acrylonitrile.

Examples of vinyl ester may include vinyl acetate, vinyl propionate, vinyl laurate, and the like.

Examples of the aromatic vinyl compound may include styrene, chlorostyrene, chloromethyl styrene, a-methyl styrene, and/or other substituted styrene.

Examples of the carboxyl group containing monomer may include (meth)acrylic acid, carboxyethyl (meth)acrylate, carboxypentyl (meth)acrylate, itaconic acid, maleic acid, fumaric acid, crotonic acid, isocrotonic acid, and the like.

Examples of the acid anhydride containing monomer may include maleic anhydride, itaconic anhydride, and/or other acid anhydrides.

Examples of the hydroxyl group containing monomer may include 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, (4-hydroxymethylcyclohexyl) methacrylate, N-methylol (meth)acrylamide, vinyl alcohol, allylalcohol, 2-hydroxyethyl vinyl ether, 4-hydroxybutyl vinyl ether, diethyleneglycol monovinyl ether, and the like.

Examples of the amide group containing monomer may include (meth)acrylamide, diethylacrylamide, N-vinylpyrrolidone, N,N-dimethyl (meth)acrylamide, N,N-diethyl (meth)acrylamide, N,N'-methylene bis acrylamide, N,N-dimethylaminopropyl (meth)acrylamide, diacetone acrylamide, and the like.

Examples of the amino group containing monomer may include aminoethyl (meth)acrylate, N,N-dimethylaminoethyl (meth)acrylate, N,N-dimethylaminopropyl (meth)acrylate, (meth)acryloyl morpholine, and the like.

Examples of the imide group containing monomer may include cyclohexyl maleimide, isopropyl maleimide, N-cyclohexyl maleimide, itaconimide, and the like.

Examples of the epoxy group containing monomer may include glycidyl (meth)acrylate, methylglycidyl (meth)acrylate, allylglycidylether, and the like.

Examples of the ether group containing monomer may include 2-methoxyethyl (meth)acrylate, 2-ethoxyethyl (meth)acrylate, butoxyethyl (meth)acrylate, phenoxyethyl (meth)acrylate, acryloyl morpholine, and the like.

An amount of the monomer having the crosslinkable functional group may range from 1 to 50 wt. % in a total weight (100 wt. %) of the monomer included in a copolymer.

The acrylic copolymer comprising the foregoing ingredients may be prepared by any conventional method such as solution polymerization, photo-polymerization, bulk polymerization, suspension polymerization, emulsion polymerization, etc. and solution polymerization is preferably used.

The acrylic copolymer may have a weight average molecular weight (in terms of polystyrene) ranging from 50,000 to 2,000,000, preferably 100,000 to 1,800,000, and more preferably 500,000 to 1,500,000, as measured by gel permeation chromatography (GPC).

The crosslinking agent capable of suitably crosslinking the acrylic copolymer to reinforce cohesive force of the adhesive may include, for example, an isocyanate compound, an epoxy compound, melamine resin, an aziridine compound, etc., which is used alone or as a combination of two or more thereof. The isocyanate compound or epoxy compound is preferably used.

Examples of the isocyanate compound may include tolylene diisocyanate, xylene diisocyanate, hexamethylene diisocyanate, 2,4-diphenylmethane diisocyanate, 4,4-diphenylmethane diisocyanate, isophorone diisocyanate, tetramethylxylene diisocyanate, naphthalene diisocyanate, and the like.

Examples of the epoxy compound may include ethyleneglycol diglycidylether, triglycidylether, trimethylolpropane triglycidylether, N,N,N', N'-tetraglycidyldiamine, glycerin diglycidylether, 1,3-bis(N,N-diglycidylaminomethyl)cyclohexene, and the like.

An example of the melamine resin is hexamethylol melamine.

Examples of the aziridine compound may include N,N'-toluene-2,4-bis(1-aziridinecarboxide), N,N'-diphenylmethane-4,4'-bis(1-aziridinecarboxide), triethylenemelamine, bisisoprotaloyl-1-(2-methylaziridine), tri-1-aziridinyl phosphineoxide, and the like.

An amount of the crosslinking agent may range from 0.01 to 15 wt. parts relative to 100 wt. parts of adhesive resin. If the amount of the crosslinking agent is less than 0.01 wt. parts, adhesive intensity or cohesive force of the adhesive may be poor. On the other hand, if the amount exceeds 15 wt. parts, compatibility of the adhesive may be reduced which in turn generates surface transition and crosslinkage reaction may be done too much, causing a decrease in adhesiveness of the adhesive.

The crosslinking agent may comprise a UV curable multi-functional (meth)acrylate monomer. Such monomer may include, for example: bi-functional monomer such as 1,4-butanediol di(meth)acrylate, 1,6-hexanediol di(meth)acrylate, neopentylglycol di(meth)acrylate, polyethyleneglycol di(meth)acrylate, dicyclopentanyl di(meth)acrylate, caprolactone modified dicyclopentenyl di(meth)acrylate, ethyleneoxide modified phosphoric acid di(meth)acrylate, di(acryloxyethyl)isocyanurate, allylated cyclohexyl di(meth) acrylate, dimethyloldicyclopentane diacrylate, ethyleneoxide modified hexahydrophthalic diacrylate, tricyclodecanedimethanol acrylate, neopentylglycol modified trimethylolpropane diacrylate, adamantane diacrylate, etc.; trifunctional monomer such as trimethylolpropane tri(meth)acrylate, dipentaerythritol tri(meth)acrylate, propionic acid modified dipentaerythritol tri(meth)acrylate, pentaerythritol tri(meth)acrylate, propyleneoxide modified trimethylolpropane tri(meth)acrylate, tris(acryloxylethyl) isocyanurate, etc.; tetra-functional monomer such as diglycerin tetra(meth) acrylate, pentaerythritol tetra(meth)acrylate, etc.; penta-functional monomer such as propinoic acid modified dipentaerythritol penta(meth)acrylate; hexa-functional monomer such as caprolactone modified dipentaerythritol hexa(meth) acrylate, and so forth, which is used alone or as a combination of two or more thereof.

An amount of the UV curable multi-functional (meth)acrylate monomer may range from 0.1 to 30 wt. parts relative to 100 wt. parts of adhesive resin.

The UV curable multi-functional (meth)acrylate monomer may be used together with a photo-polymerizing initiator to irradiate UV rays in order to generate radicals and/or cations.

Such photo-polymerizing initiator may include, for example, benzoin, benzoin methylether, benzoin ethylether, benzoin isopropylether, benzoin-n-butylether, benzoin isobutylether, acetophenone, dimethylaminoacetophenone, 2,2-dimethoxy-2-phenylacetophenone, 2,2-diethoxy-2-phenylacetophenone, 2-hydroxy-2-methyl-1-phenylpropane-1-on, 1-hydroxycyclohexyl phenylketone, 2-methyl-1-[4-(methylthio)phenyl]-2-morpholino-propane-1-on, 4-(2-hydroxyethoxy)phenyl-2-(hydroxyl-2-propyl)ketone, benzophenone, p-phenyl benzophenone, 4,4'-diethyl aminobenzophenone, dichlorobenzophenone, 2-methyl anthraquinone, 2-ethyl anthraquinone, 2-t-butyl anthraquinone, 2-amino anthraquinone, 2-methylthioxanthone, 2-ethylthioxanthone, 2-chlorothioxanthone, 2,4-dimethylthioxanthone, 2,4-diethylthioxanthone, benzyldimethylketal, acetophenone dimethylketal, p-dimethylamino benzoic acid ester, 2,4,6-trimethylbenzoyl-diphenyl-phosphineoxide, and the like, which is used alone or as a combination of two or more thereof. The photo-polymerizing initiator may be contained in an amount of 0.1 to 20 wt. parts, preferably 0.2 to 10 wt. parts in 100 wt. parts of adhesive resin.

An anti-static agent may be a metal salt comprising alkali-metal cation and bis(fluorosulfonyl)imide anion, which is represented by Formula 1:

$$M^+[(FSO_2)_2N]^-$$

wherein M is an alkali metal.

The above alkali metal may be at least one selected from a group consisting of lithium, sodium, potassium and cesium. Lithium, sodium or potassium is preferably used.

As for the anti-static agent, fluorine atoms in the anion have high electro-negativity to exhibit relatively low degree of covalent bonding to alkali-metal cation and high hydrophobicity, so that the anti-static agent may exhibit excellent compatibility to acrylic copolymer without surface transition, and may impart enhanced durability and reliability as well as anti-static properties. Compared to alkylsulfonylimide perfluoride, an anion of the above anti-static agent has a relatively small radius and freely moves in the adhesive, thus having superior anti-static properties.

An amount of the anti-static agent is not particularly limited and may range from 0.01 to 10 wt. parts, preferably 0.1 to 5 wt. parts, and more preferably 0.3 to 3 wt. parts relative to 100 wt. parts of adhesive resin. If the amount is less than 0.01 wt. parts, anti-static properties may be slightly improved. On the other hand, if the amount exceeds 10 wt. parts, cohesive force of the adhesive is insufficient, causing reduction in durability and reliability.

The anti-static adhesive composition containing the foregoing ingredients may further include a silane coupling agent in order to enhance adhesiveness of the composition to a liquid crystal cell or a substrate.

The silane coupling agent may include, for example, vinyltrimethoxysilane, vinyltriethoxysilane, methacryloxypropyl trimethoxysilane, 3-glycidoxypropyl trimethoxysilane, 3-glycidoxypropyl triethoxysilane, 3-mercaptopropyl trimethoxysilane, 3-methacryloxypropyl trimethoxysilane, 3-methacryloxypropyl triethoxysilane, 2-(3,4-epoxycyclohexyl)ethyl trimethoxysilane, 3-aminopropyl trimethoxysilane, 3-chloropropyl trimethoxysilane, and the like, which is used alone or as a combination of two or more thereof. The silane coupling agent may be contained in an amount of 0.005 to 5 wt. parts in 100 wt. parts of adhesive resin.

In order to control adhesive intensity, cohesive force, viscosity, elastic modulus, glass transition temperature, etc., the adhesive composition may further include additives such as adhesion imparting resin, antioxidants, anti-corrosive agents, leveling agents, surface lubricants, dyes, pigments, anti-foaming agents, fillers and/or light stabilizers, etc.

The anti-static adhesive composition may be used as an adhesive for a polarizing plate and/or a surface protective film. In addition, the anti-static adhesive composition may be employed in various applications including, for example, a protective film, a reflection sheet, an adhesive sheet for structure, an adhesive sheet for photograph, an adhesive sheet for indicating traffic lane, optical adhesive products, an adhesive for electronics and, in addition, commercial adhesive sheet products, medical patches, and so forth.

The polarizing plate of the present invention has an anti-static adhesive layer laminated thereon, which comprises the anti-static adhesive composition described above.

The polarizing plate may include a polarizer (or 'polarizing film'), wherein a polarizer protective film, an adhesive layer combined with a liquid crystal cell and a release film are laminated in order at one side of the polarizer while another polarizer protective film is provided at the other side of the polarizer.

The polarizer may be a polyvinyl alcohol based resin film in which a dichroic material is adsorbed thereto and oriented. The polyvinyl alcohol based resin of the polarizer may comprise polyvinyl acetate as a vinyl acetate homopolymer, or a copolymer of vinyl acetate and a monomer capable of being copolymerized with vinyl acetate. Such monomer copolymerized with vinyl acetate may include, for example, unsaturated carboxylic acids, unsaturated sulfonic acids, olefins, vinyl ethers, ammonium group containing acrylamides, and the like. The thickness of the polarizer is not particularly limited and the polarizer may be formed with a thickness generally used in the related art.

The polarizer protective film may have desired mechanical strength, thermal stability, moisture shielding properties and/or isotropic properties, and may include, for example: a polyester film such as polyethylene terephthalate, polyethylene isophthalate, polybutylene terephthalate, etc.; a cellulose film such as diacetyl cellulose, triacetyl cellulose, etc.; a polycarbonate film; an acryl film such as polymethyl (meth)acrylate, polyethyl (meth)acrylate, etc.; a styrene film such as polystyrene, acrylonitrile-styrene copolymer, etc.; a polyolefin film such as polyethylene, polypropylene, polyolefin having a cyclo or norbornene structure, ethylene-propylene copolymer, etc.; a polyimide film; a polyethersulfone film; a sulfone film, and so forth. A thickness of the polarizer protective film is not particularly limited.

The release film for protecting the anti-static adhesive layer may be fabricated using any film which is not particularly limited so long as the film is generally used in the related art. Examples of the release film may include: a polyolefin film such as polyethylene, polypropylene, poly-1-butene, poly-4-methyl-1-pentene, ethylene-propylene copolymer, ethylene-1-butene copolymer, ethylene-vinyl acetate copolymer, ethylene-ethyl acrylate copolymer, ethylene-vinyl alcohol copolymer, etc.; a polyester film such as polyethylene terephthalate, polyethylene naphthalate, polybutylene terephthalate, etc.; a polyamide film such as polyacrylate, polystyrene, nylon 6, partial aromatic polyamide, etc.; a polyvinyl chloride film; a polyvinylidene chloride film; a polycarbonate film, and the like. Such release film may be used after release coating the same with silicon, fluorine or silica powder.

The anti-static adhesive layer may be laminated on the polarizing plate by any conventional method without particularly restriction thereof. For instance, an adhesive composition may be directly applied to the polarizer protective film in a desired spreading way using any known application method such as air knife, gravure, reverse roll, kiss roll, spray, blade, etc. and/or by a flow casting process, followed by drying the coated film so as to complete the lamination. Alternatively, after an adhesive layer is formed on a silicon coated release film by the same application method as described above to obtain an adhesive sheet, the prepared adhesive sheet may be laminated on the polarizer protective film via a roll press device. In case where the adhesive composition includes UV curable multi-functional (meth)acrylate monomer, UV irradiation may be performed after the adhesive composition is applied or laminated on the polarizer protective film using the roll press device.

A thickness of the anti-static adhesive layer may be changed depend on the adhesive intensity and may generally range from 3 to 100 μm, and preferably, 10 to 100 μm.

The polarizing plate may be applied to common LCDs and, particularly, may be used for a LCD comprising a liquid crystal panel, wherein the polarizing plate having an anti-static adhesive layer laminated thereon is adhered to one side or both sides of a liquid crystal cell.

The surface protective film protects an optical film, in particular, an outmost layer of the polarizing plate and may comprise an anti-static adhesive layer consisting of the anti-static adhesive composition described above laminated on substrate film and a release film laminated thereon in sequential order.

The substrate film is used as a base material for laminating the adhesive layer thereon and may include, for example: a polycarbonate film; a polyester film such as polyethylene terephthalate; polyethersulfone film; a polyolefin film such as polyethylene, polypropylene, polyolefin having a cyclo or norbornene structure, ethylene-propylene copolymer, or the like. In this regard, in order to adhesiveness to the adhesive, one side or both sides of the substrate film may be treated by surface treatment or primer treatment.

The release film for protecting the anti-static adhesive layer may be the same as used in the polarizing plate.

The method for laminating the anti-static adhesive layer on the substrate film may be the same as employed in lamination of the adhesive layer on the polarizing plate.

A thickness of the anti-static adhesive layer may be changed depend on adhesive intensity thereof and may generally range from 2 to 100 μm, preferably 5 to 50 μm.

The surface protective film may be used for optical devices such as a polarizing plate and/or typical LCDs.

Exemplary embodiments of the present invention will be described in more detail as follows. However, the following examples are proposed for illustrative purposes and those skilled in the art will appreciate that various modifications, additions and/or substitutions are possible without departing from the scope and spirit of the invention which is defined in the accompanying claims and their equivalents.

Mode for the Invention

Hereinafter, "%" and "parts" expressing contents of ingredients in Examples and/or Comparative Examples mean "% by weight" and "parts by weight" unless otherwise specified.

EXAMPLE 1

Nitrogen gas was introduced and fully filled in a 1L 4-neck jacket reactor equipped with an agitator, a thermometer, a reflux condenser, a drop lot and a nitrogen gas feeding duct. 164 parts of ethyl acetate, 126 parts of n-butyl acrylate, 0.5 parts of acrylic acid and 1.3 parts of 2-hydroxyethyl acrylate were fed into the reactor, followed by elevating an external temperature of the reactor to 50° C. Then, a well-dissolved solution comprising 0.14 parts of 2,2'-azobisisobutyronitrile (AIBN) in 10 parts of ethyl acetate was slowly dropped into the reactor. While maintaining the external temperature of the jacket at 50° C., the reaction was further continued for 5 hours. Afterward, 90 parts of ethyl acetate was slowly dropped into the reactor for 1 hour via the drop lot. Next, after agitating the mixture in the reactor at the same temperature for 6 hours, 304 parts of ethyl acetate was added thereto, followed by additional agitation of the same for 2 hours, thus obtaining alkyl (meth)acrylate copolymer as a resultant product. It was found that the prepared alkyl (meth)acrylate copolymer has a solid content of 20% and a weight average molecular weight (in terms of polystyrene) of about 1,500,000 as measured by GPC.

100 parts (as the solid content) of prepared acrylic copolymer resin, 0.8 parts of trimethylolpropane-modified tolylene diisocyanate (trade name "Coronate L" manufactured by Nippon Polyurethane Industry Co., Ltd) as a crosslinking agent, and 0.02 parts of $KN(FSO_2)_2$ as an anti-static agent were added to the above prepared copolymer and the resulting product was diluted to have a desired concentration using ethyl acetate, so as to produce an adhesive composition.

The produced adhesive composition was applied to a polyethylene terephthalate film having a size of 41 cm×34 cm, which is coated with a silicon release agent, to reach a dry thickness of about 25 μm, followed by drying the same to form an adhesive layer. Lastly, an additional release film was laminated thereon to produce an adhesive sheet.

EXAMPLE 2

The same procedure described in Example 1 was performed, except that 0.1 parts of $KN(FSO_2)_2$ was used as an anti-static agent.

EXAMPLE 3

The same procedure described in Example 1 was performed, except that 0.3 parts of $KN(FSO_2)_2$ was used as an anti-static agent.

EXAMPLE 4

The same procedure described in Example 1 was performed, except that 1.0 part of $KN(FSO_2)_2$ was used as an anti-static agent.

EXAMPLE 5

The same procedure described in Example 1 was performed, except that 2.0 parts of $KN(FSO_2)_2$ was used as an anti-static agent.

EXAMPLE 6

The same procedure described in Example 1 was performed, except that 5.0 parts of $KN(FSO_2)_2$ was used as an anti-static agent.

EXAMPLE 7

The same procedure described in Example 1 was performed, except that 9.0 parts of $KN(FSO_2)_2$ was used as an anti-static agent.

EXAMPLE 8

The same procedure described in Example 3 was performed, except that 0.15 parts of 3-glycidoxypropyl trimethoxysilane (KBM-403 manufactured by Shin-Etsu Chemical Co., Ltd.) as a silane coupling agent was further added.

EXAMPLE 9

The same procedure described in Example 1 was performed, except that 0.005 parts of $KN(FSO_2)_2$ was used as an anti-static agent.

EXAMPLE 10

The same procedure described in Example 1 was performed, except that 12 parts of $KN(FSO_2)_2$ was used as an anti-static agent.

COMPARATIVE EXAMPLE 1

The same procedure described in Example 1 was performed, except that 0.3 parts of LiI was used as an anti-static agent.

COMPARATIVE EXAMPLE 2

The same procedure described in Example 1 was performed, except that 0.3 parts of $LiClO_4$ was used as an anti-static agent.

COMPARATIVE EXAMPLE 3

The same procedure described in Example 1 was performed, except that 0.3 parts of IL-P14-2 (4-methyl-1-hexyl pyridinium hexafluorophosphate) was used as an anti-static agent.

TABLE 1

| Section | Copolymer | Crosslinking agent COR-L | Silane coupling agent KBM-403 | Anti-static agent | | | |
|---|---|---|---|---|---|---|---|
| | | | | $KN(FSO_2)_2$ | Li I | $LiClO_4$ | IL-P14-2 |
| Example 1 | 100 | 0.8 | — | 0.02 | — | — | — |
| Example 2 | 100 | 0.8 | — | 0.1 | — | — | — |
| Example 3 | 100 | 0.8 | — | 0.3 | — | — | — |
| Example 4 | 100 | 0.8 | — | 1.0 | — | — | — |
| Example 5 | 100 | 0.8 | — | 2.0 | — | — | — |
| Example 6 | 100 | 0.8 | — | 5.0 | — | — | — |
| Example 7 | 100 | 0.8 | — | 9.0 | — | — | — |

TABLE 1-continued

| Section | Copolymer | Crosslinking agent COR-L | Silane coupling agent KBM-403 | Anti-static agent | | | |
|---|---|---|---|---|---|---|---|
| | | | | KN(FSO$_2$)$_2$ | Li I | LiClO$_4$ | IL-P14-2 |
| Example 8 | 100 | 0.8 | 0.15 | 0.3 | — | — | — |
| Example 9 | 100 | 0.8 | — | 0.005 | — | — | — |
| Example 10 | 100 | 0.8 | — | 12 | — | — | — |
| Comparative Example 1 | 100 | 0.8 | — | — | 0.3 | — | — |
| Comparative Example 2 | 100 | 0.8 | — | — | — | 0.3 | — |
| Comparative Example 3 | 100 | 0.8 | — | — | — | — | 0.3 |

EXPERIMENTAL EXAMPLE

Physical properties of adhesive sheets fabricated in the above examples and comparative examples were determined according to the following procedures and results thereof are shown in Table 2.

* Surface Specific Resistance (Ω/sq)
 Measurement apparatus: surface resistance measuring device (MCP-HT450/Mitsubishi Chemical), probes (URS, UR100), probe checkers (for URS, for UR100)
 Measurement method: after stripping the release film from the adhesive sheet, three sites on the surface of the adhesive sheet were measured 10 times, respectively, followed by calculating a mean value of the measured values.

* Durability
 After cutting the adhesive sheet into pieces with a size of 30 cm in width×22 cm in length, the cut piece was attached to a glass #1737 manufactured by Corning Inc. to prepare a specimen. The prepared specimen was treated in an autoclave at 50° C. and a pressure of 5 atm for 20 minutes and then left in an oven at 60° C. and 90% RH for 300 hours. After observing appearance of the treated specimen to determine whether there is delamination such as surface lifting-off or stripping, and/or generation of bubbles, the observed results were evaluated according to the following standards.

○: neither delamination nor bubble generation is observed (good)
Δ: delamination and bubble generation are slightly observed (fair)
x: delamination and bubble generation are clearly observed (poor)

As shown in Table 2, it can be seen that the adhesive compositions prepared in Examples 1 to 10 according to the present invention, each of which comprises an anti-static agent consisting of an alkali metal salt cation and a bis(fluorosulfonyl)imide anion, exhibit improved anti-static properties while maintaining favorable adhesion durability. In particular, Examples 1 to 8 using 0.01 to 10 wt. parts of anti-static agent accomplished superior adhesion durability and anti-static properties. However, Example 9 using less than 0.01 wt. parts of anti-static agent exhibited slightly reduced anti-static properties, while Example 10 using more than 10 wt. parts of anti-static agent exhibited slightly reduced durability.

The invention claimed is:

1. An anti-static adhesive composition comprising an anti-static agent represented by Formula 1:

$$M^+[(FSO_2)_2N]^- \qquad \text{(Formula 1)}$$

wherein M is an alkali metal wherein the alkali metal is at least one selected from group consisting of lithium, sodium, potassium and cesium.

2. The anti-static adhesive composition according to claim 1, further comprising an adhesive resin and a crosslinking agent.

3. The anti-static adhesive composition according to claim 2, wherein the anti-static agent is contained in an amount of 0.01 to 10 parts by weight relative to 100 parts by weight of the adhesive resin.

4. A polarizing plate having an adhesive layer laminated thereon, wherein the adhesive layer comprises the anti-static adhesive composition as set forth in claim 1.

5. A surface protective film having an adhesive layer laminated thereon, wherein the adhesive layer comprises the anti-static adhesive composition as set forth in claim 1.

6. A liquid crystal display device having the polarizing plate as set forth in claim 4 on at least one side of a liquid crystal cell.

7. A polarizing plate having an adhesive layer laminated thereon, wherein the adhesive layer comprises the anti-static adhesive composition as set forth in claim 2.

8. A polarizing plate having an adhesive layer laminated thereon, wherein the adhesive layer comprises the anti-static adhesive composition as set forth in claim 3.

TABLE 2

| | Examples | | | | | | | | | | Comparative Examples | | |
|---|---|---|---|---|---|---|---|---|---|---|---|---|---|
| Section | 1 | 2 | 3 | 4 | 5 | 6 | 7 | 8 | 9 | 10 | 1 | 2 | 3 |
| Surface specific resistance (Ω/sq) | 3.9E11 | 2.6E11 | 2.3E11 | 8.2E10 | 3.5E10 | 2.7E9 | 1.8E9 | 2.7E11 | 2.5E12 | 1.3E9 | 6.0E11 | 7.1E11 | 2.3E12 |
| Durability | ○ | ○ | ○ | ○ | ○ | ○ | ○ | ○ | ○ | Δ | x | x | x |

9. A surface protective film having an adhesive layer laminated thereon, wherein the adhesive layer comprises the anti-static adhesive composition as set forth in claim 2.

10. A surface protective film having an adhesive layer laminated thereon, wherein the adhesive layer comprises the anti-static adhesive composition as set forth in claim 3.

* * * * *